United States Patent
Cohen

(10) Patent No.: US 11,342,849 B2
(45) Date of Patent: May 24, 2022

(54) MULTIMODE PWM CONVERTER WITH SMOOTH MODE TRANSITION

(71) Applicant: Texas Instruments Incorporated, Dallas, TX (US)

(72) Inventor: Isaac Cohen, Dix Hills, NY (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 200 days.

(21) Appl. No.: 16/736,600

(22) Filed: Jan. 7, 2020

(65) Prior Publication Data

US 2020/0144923 A1 May 7, 2020

Related U.S. Application Data

(62) Division of application No. 16/011,757, filed on Jun. 19, 2018, now Pat. No. 10,566,904.

(Continued)

(51) Int. Cl.
| | |
|---|---|
| *H02M 3/158* | (2006.01) |
| *H02M 1/32* | (2007.01) |
| *H02M 1/08* | (2006.01) |
| *H02M 3/156* | (2006.01) |
| *H02M 3/157* | (2006.01) |

(Continued)

(52) U.S. Cl.
CPC .......... *H02M 3/1588* (2013.01); *H02M 1/08* (2013.01); *H02M 1/32* (2013.01); *H02M 3/156* (2013.01); *H02M 3/157* (2013.01); *H02M 3/158* (2013.01); *H02M 3/1584* (2013.01); *H02M 3/33507* (2013.01); *H02M 3/33576* (2013.01);

(Continued)

(58) Field of Classification Search
CPC .................................................. H02M 3/1588
See application file for complete search history.

(56) References Cited

U.S. PATENT DOCUMENTS

| | | |
|---|---|---|
| 5,412,555 A | 5/1995 | Uramoto |
| 5,457,624 A | 10/1995 | Hastings |

(Continued)

FOREIGN PATENT DOCUMENTS

| | | |
|---|---|---|
| EP | 2757675 A2 | 7/2014 |

OTHER PUBLICATIONS

Zhang et al., "A High Efficiency Flyback Converter With New Active Clamp Technique", IEEE Transactions on Power Electronics, vol. 25, No. 7, Jul. 2010, pp. 1775-1785.017.

(Continued)

*Primary Examiner* — Jeffrey A Gblende
(74) *Attorney, Agent, or Firm* — Michael T. Gabrik; Charles A. Brill; Frank D. Cimino

(57) ABSTRACT

Control circuits and methods to operate a switch of a DC-DC converter, including an output circuit to turn the switch off to control a peak inductor current in a given switching control cycle, and a modulation circuit to implement transition mode (TM) or continuous conduction mode (CCM) operation for a given switching control cycle by causing the output circuit to turn the switch on in response to an earlier one of a first signal, that represents an inductor current of the DC-DC converter, decreasing to a reference voltage that represents a zero crossing of the inductor current for the TM operation or the first signal decreasing to a valley reference signal that represents a non-zero value of the inductor current for the CCM operation.

14 Claims, 9 Drawing Sheets

Related U.S. Application Data

(60) Provisional application No. 62/572,762, filed on Oct. 16, 2017.

(51) Int. Cl.
  *H02M 3/335* (2006.01)
  *H02M 1/00* (2006.01)

(52) U.S. Cl.
  CPC ........ *H02M 1/0025* (2021.05); *H02M 1/0032* (2021.05); *H02M 1/0058* (2021.05)

(56) References Cited

U.S. PATENT DOCUMENTS

| | | |
|---|---|---|
| 5,612,609 A | 3/1997 | Choi |
| 5,745,358 A | 4/1998 | Faulk |
| 5,768,118 A | 6/1998 | Faulk et al. |
| 6,441,598 B1 | 8/2002 | Ivanov |
| 6,504,267 B1 | 1/2003 | Giannopoulos |
| 6,686,729 B1 | 2/2004 | Kawamura et al. |
| 6,861,826 B2 | 3/2005 | Lynch |
| 8,299,764 B2 | 10/2012 | Laur et al. |
| 8,963,529 B2 | 2/2015 | Cohen |
| 8,964,420 B2 | 2/2015 | Zhang |
| 10,418,896 B2 | 9/2019 | Takada |
| 2002/0141209 A1 | 10/2002 | Bridge |
| 2004/0070378 A1 | 4/2004 | Baldwin et al. |
| 2004/0150439 A1 | 8/2004 | Greenfeld |
| 2007/0242487 A1 | 10/2007 | Orr |
| 2008/0278975 A1 | 11/2008 | Degen et al. |
| 2008/0284398 A1 | 11/2008 | Qiu et al. |
| 2008/0298106 A1 | 12/2008 | Tateishi |
| 2009/0190377 A1 | 7/2009 | Wang et al. |
| 2009/0322299 A1* | 12/2009 | Michishita ............ H02M 3/156 323/282 |
| 2010/0027298 A1 | 2/2010 | Cohen |
| 2010/0195254 A1 | 8/2010 | Cohen et al. |
| 2010/0201335 A1 | 8/2010 | Li et al. |
| 2010/0315840 A1 | 12/2010 | Cohen |
| 2011/0062932 A1* | 3/2011 | Hawkes ................ H02M 3/156 323/288 |
| 2011/0090725 A1 | 4/2011 | Lu |
| 2011/0205764 A1 | 8/2011 | Sheng et al. |
| 2012/0081928 A1 | 4/2012 | Roessler et al. |
| 2012/0275198 A1 | 11/2012 | Cohen |
| 2013/0077356 A1 | 3/2013 | Cohen |
| 2013/0148385 A1 | 6/2013 | Zhang |
| 2013/0272036 A1 | 10/2013 | Fang |
| 2014/0003096 A1 | 1/2014 | Deng |
| 2014/0078790 A1 | 3/2014 | Lin et al. |
| 2014/0217996 A1* | 8/2014 | Peker .................. H02M 3/1582 323/271 |
| 2015/0092454 A1 | 4/2015 | Cohen |
| 2015/0103563 A1 | 4/2015 | Wang |
| 2015/0103567 A1 | 4/2015 | Wang et al. |
| 2015/0214846 A1 | 7/2015 | Cohen |
| 2015/0311804 A1 | 10/2015 | Fang |
| 2016/0094137 A1 | 3/2016 | Jitaru et al. |
| 2016/0233779 A1 | 8/2016 | Cohen |
| 2016/0359421 A1 | 12/2016 | Lin et al. |
| 2017/0033698 A1 | 2/2017 | Vemuri et al. |

OTHER PUBLICATIONS

Dinwoodie, "Exposing the Inner Behavior of a Quasi-Resonant Flyback Converter," 2012 Texas Instruments Power Supply Design Seminar, SEM2000, Topic 3, TI Literature No. SLUP302, 2012, 2013 Texas Instruments Incorporated, 27 pages.

* cited by examiner

MULTIMODE PWM CONVERTER WITH SMOOTH MODE TRANSITION

CROSS-REFERENCE TO RELATED APPLICATIONS

Under 35 U.S.C. §§ 119(e), 121, this divisional application claims benefits of priority to U.S. patent application Ser. No. 16/011,757 (TI-79108), filed on Jun. 19, 2018, which claims priority to, and the benefit of, U.S. Provisional Patent Application No. 62/572,762, filed on Oct. 16, 2017. The above referenced applications are hereby incorporated herein by reference in their entirety.

BACKGROUND

Pulse width modulated (PWM) power conversion circuits or converters can be used for DC-DC conversion to process power by modulating the amplitude of the current in an inductor. A variety of different DC-DC converter topologies have been developed to convert an input signal, such as a DC input voltage or current, to provide a DC output voltage or current signal to drive a load. DC-DC converters may operate in different modes with respect to the conduction of the inductor current, including continuous conduction mode (CCM) where the inductor current does not reach zero, discontinuous conduction mode (DCM) where the inductor current is zero for some time interval, and transition mode or critical conduction mode (TM or CrCM) at the boundary between CCM and DCM, in which the inductor current is zero for a near zero time interval. In certain applications it is desirable to allow a DC-DC converter to operate in more than one mode, for example, to accommodate variations in load conditions. However, dedicated control circuitry for operation in each mode and logic circuitry to switch between modes reduces converter efficiency and power density.

SUMMARY

Described examples include control circuits and methods for operating DC-DC converters. The control circuit in one example includes an output circuit to turn a DC-DC converter switch off to control a peak inductor current in a given switching control cycle. The control circuit also includes a modulation circuit to implement transition mode (TM) or continuous conduction mode (CCM) operation for a given switching control cycle. The modulation circuit in one example causes the output circuit to turn the switch on in response to an earlier one of a first signal that represents an inductor current of the DC-DC converter, decreasing to a reference voltage that represents a zero crossing of the inductor current for the TM operation, or the first signal decreasing to a valley reference signal that represents a non-zero value of the inductor current for the CCM operation.

DETAILED DESCRIPTION

Figure 1:
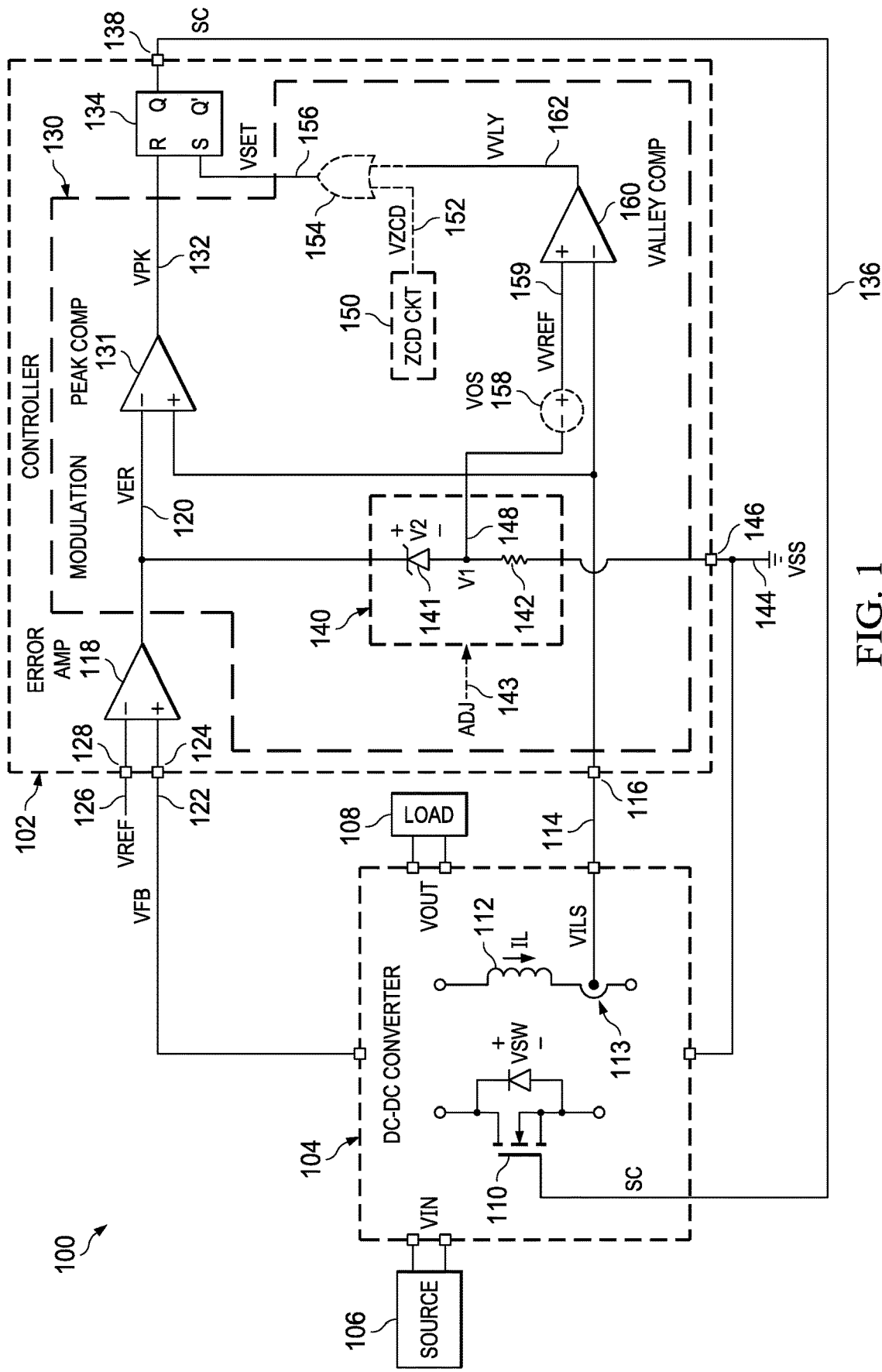
FIG. 1 is a schematic diagram of a DC-DC converter with a control circuit that includes a modulation circuit to implement hysteretic inductor current control with smooth transitions between CCM and TM operation according to one aspect of the present disclosure.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Also, the term "couple" or "couples" is intended to include indirect or direct electrical or mechanical connection or combinations thereof. For example, if a first device couples to or is coupled with a second device, that connection may be through a direct electrical connection, or through an indirect electrical connection via one or more intervening devices and connections. Disclosed examples provide DC-DC converters, control circuitry, and operating methods to facilitate PWM or switching DC-DC converter operation in multiple modes with smooth mode transitions. Disclosed implementations, moreover, provide smooth mode switching without requiring extensive logic circuitry to detect operating modes, and without dedicated control circuitry for operation in each individual mode. In described implementations, control circuitry implements smooth transition between transition (TM) and continuous conduction (CCM) DC-DC converter operating modes, and provides stability for CCM operation. As used herein, the transition mode operation includes DCM operation of a converter.

FIG. 1 shows a DC-DC converter or power conversion system 100 with a control circuit 102 (e.g., controller), and a DC-DC converter 104 that converts an input signal from a power source 106 to an output signal to drive a load 108. In one example, the control circuit 102 regulates one or more controlled parameters associated with operation of the DC-DC converter 104, such as input current, output current, output voltage, power factor, or combinations of such operating parameters. In the illustrated example, the DC-DC converter 104 receives a DC voltage input signal VIN, and converts the input signal to provide a DC voltage output signal VOUT to the load 108. The control circuit 102 in one example is an integrated circuit (e.g., a controller chip or controller IC) with various contacts (e.g., pads or pins) that provide electrical connectivity to power connections and the DC-DC converter 104. The example DC-DC converter 104 is a switching converter. The control circuit 102 can be used to operate any type of DC-DC converter 104, including, but not limited to, buck converters, boost converters (e.g., FIG. 8 below) buck-boost converters, cuk converters, and flyback converters (e.g., FIGS. 3 and 6-8 below). The DC-DC converter 104 includes a controlled switch 110 and an inductor 112. The switch 110 can be any suitable type, including, but not limited to, a field effect transistor (FET), a bipolar transistor, or an insulated-gate bipolar transistor (IGBT). In one example, the switch 110 is an n-channel MOSFET with a gate control terminal, a source, and a drain. In operation, the switch 110 operates in an on state and an off state to control the impedance between the source and drain, and a corresponding switch voltage (e.g., drain-source voltage) VSW of the switch 110.

The control circuit 102 provides a switching control signal SC to a gate or other control terminal to operate the switch 110, and thereby control an inductor current IL that flows through the inductor 112. In one example, the control circuit 102 provides the switching control signal SC in a first state to turn the switch 110 on and another state to turn the switch 110 off in each of a succession of switching control cycles, and the control circuit 102 regulates the duty cycle or on-time of the controlled switch 110 through pulse width modulation (PWM) of the switching control signal SC in order to cause the converter 104 to convert the input signal to an output signal to drive a load 108.

The switch 110 and the inductor 112 can be operatively coupled in a variety of different circuit configurations in different implementations, by which the operation of the switch 110 influences the current IL flowing through the inductor 112. In one possible configuration, the switch 110 and the inductor 112 are coupled in series with one another, although not a strict requirement of all possible implementations of the DC-DC converter 104. In one example, the control circuit 102 regulates an amplitude of the output voltage signal VOUT. In other possible implementations, the converter 104 operates on different forms or types of input and/or output signals, such as voltages, currents, and/or combinations thereof. The DC-DC converter 104 includes or is operatively coupled with a sensor 113 that directly or indirectly senses or estimates the inductor current IL. The sensor 113 in one example provides a first signal (e.g., a voltage signal) VILS that represents the inductor current IL. In this example, the DC-DC converter 104 includes an output 114 coupled with a signal input pin or pad 116 of the control circuit 102 to deliver the first signal VILS to the control circuit 102.

The control circuit 102 includes an amplifier 118 (e.g., an error amplifier, such as an op amp, labeled ERROR AMP in FIG. 1). The amplifier 118 includes an output at a first node 120 that generates an error signal VER that represents the difference between a reference signal VREF and a second signal VFB (e.g., a feedback signal) that represents a controlled parameter of the DC-DC converter 104. In the illustrated example, the error signal VER is a voltage signal generated by the amplifier output 120. The DC-DC converter 104 in FIG. 1 includes an output 122 that provides or delivers the second signal VFB to a feedback signal input pin or pad 124 of the control circuit IC 102. In the illustrated example, moreover, the error amplifier 118 includes a non-inverting (+) input coupled with the feedback signal input 124 to receive the feedback signal VFB. The example amplifier 118 includes a second (inverting or "+") input 126 coupled to receive the reference signal VREF from an external source (not shown) via an IC pin or pad 128. In another possible implementation, the control circuit IC 102 includes an internal reference circuit (not shown) to supply the reference signal VREF. In the illustrated example, the reference signal is a voltage signal that represents a set point or desired value for the controlled (e.g., regulated) operating parameter of the DC-DC converter 104. The in one non-limiting in fermentation, the feedback signal VFB represents an output voltage VOUT of the DC-DC converter, and the reference signal VREF represents a desired value of the output voltage VOUT delivered to the load 108.

The control circuit 102 also includes a modulation circuit 130 with a first comparator 131 (e.g., a peak comparator labeled PEAK COMP in the drawings). An output terminal of the first comparator 131 provides a first output 132 of the modulation circuit 130 at an output node. The output 132 provides a first input signal VPK to an output circuit 134. In the illustrated example, the first comparator 131 includes an inverting (−) first input terminal connected to the amplifier output 120 to receive the error signal VER, and a non-inverting (+) second input terminal coupled to a second node to receive the first signal VILS from the output 114 of the DC-DC converter 104. The first comparator 131 in one example provides the first input signal VPK in a first state (e.g., HIGH) when the first signal VILS equals or exceeds the error signal VER. This causes the output circuit 134 to turn the DC-DC converter switch 110 off in the individual switching control cycles. When the first signal VILS is less than the error signal VER, the first comparator output terminal 131 provides the first input signal VPK in a different second state (e.g., LOW).

The output circuit 134 in one example is a flip-flop (e.g., an S-R flip-flop), with a reset input labeled "R", a set input labeled "S", a non-inverted output 136 (labeled "Q"), and an inverted output labeled "V". The non-inverted (Q) output forms an output of the flip-flop output circuit 134 that provides the switching control signal SC to the gate control terminal of the DC-DC converter switch 110 via an output pin or pad 138 of the control circuit IC 102. In successive switching control cycles, the output 136 provides a switching control signal SC in a first state (e.g., LOW) to turn the switch 110 off in response to the first input signal VPK, and to then provides the switching control signal SC in a different second state (e.g., HIGH) to turn the switch 110 on in response to a second input signal VSET from the modulation circuit 130.

The example modulation circuit 130 further includes a first offset circuit 140 that generates a first voltage signal V1 according to the error signal VER from the error amplifier 118. The circuit 140 in one example includes a first terminal connected to the first node 120, a second terminal connected to the second node (114), and a third terminal coupled to a node 148. The first offset circuit 140 in the example of FIG. 1 generates the first voltage signal V1 offset from the error signal VER by a non-zero second voltage V2. In this example, the first offset circuit 140 includes a Zener diode 141 and a resistor 142 coupled in series with the Zener diode 141 between the output 120 of the amplifier 118 and a reference voltage VSS. In one example the reference voltage VSS is a circuit ground voltage, although not a requirement of all possible implementations. In the illustrated example, the lower end of the resistor 142 is connected to a reference voltage node 144 via a ground connection pin or pad 146 of the control circuit IC 102.

The series combination of the Zener diode 141 and the resistor 142 generates the first voltage signal V1 at a node 148 that joins the Zener diode 141 and the resistor 142. The Zener diode 141 in this example has a breakdown voltage (e.g., Zener voltage) that sets the voltage V1 of the node 148 depending on the voltage of the error signal VER. When the error signal VER is less than the Zener voltage of the Zener diode 141, the current through the Zener diode 141, and the current through the resistor 142, are zero, and the voltage V1 is the same as the reference voltage VSS (e.g., 0 V). When the error voltage VER reaches or exceeds the Zener voltage of the Zener diode 141, the Zener diode 141 begins to conduct current, and this current flow through the resistor 142 raises the voltage V1 above 0 V. In other implementations, the first offset circuit 140 is programmable or adjustable to allow setting or adjusting of the non-zero second voltage V2. In one example, the first offset circuit 140 includes an input 143 to receive an adjustment signal ADJ to set or adjust the amount of the non-zero second voltage V2. In one example, the circuit 140 includes multiple Zener diodes (not shown) with different Zener breakdown voltages, and a switching circuit that operates according to the adjustment signal ADJ to selectively connect a selected one of the Zener diodes in series with the resistor 142 to provide a signal-selectable amount of the non-zero second voltage V2. In another example, the circuit 140 includes an adjustable voltage source operable according to a digital or analog adjustment signal ADJ to set or adjust the amount of the non-zero second voltage V2.

The example modulation circuit 130 implements hysteretic current control (e.g., the current rises and falls with non-zero hysteresis in each of a series of control cycles). The hysteretic current control in one example implements valley control that enforces the minimum inductor current IL by generating the switching control signal SC to turn the converter switch on according in response to the inductor current IL reaching a valley or low value. The modulation circuit 130 also turns the switch off in response to the inductor current IL reaching a peak or high value set by the VPK signal. The example modulation circuit 130 includes a second comparator 160 (e.g., a valley comparator labeled VALLEY COMP in FIG. 1). The second comparator 160 includes an inverting (−) first input terminal coupled to receive the first signal VILS from the output 114 of the DC-DC converter 104, a non-inverting (+) second input terminal connected to a third node 159 to receive a valley reference signal VVREF, and a second comparator output terminal 162 that provides a second comparator output signal VVLY to the third node 159. In the illustrated example, the second comparator 160 provides the second comparator output signal VVLY in a first state (e.g., HIGH) when the first signal VILS is less than or equal to the valley reference signal VVREF. This causes the output circuit 134 to turn the DC-DC converter switch 110 off for both TM and CCM operation in certain implementations. In other examples, the second comparator output signal VVLY transitioning to the first state causes the output circuit 134 to turn the DC-DC converter switch 110 off for CCM operation. When the first signal VILS is greater than the valley reference signal VVREF, the second comparator output 162 provides the second comparator output signal VVLY in a different second state (e.g., LOW).

In one example, the non-inverting input of the second comparator 160 is connected to the node 148 and the voltage of the valley reference signal VVREF is the first voltage V1. In this implementation, moreover, the second comparator output 162 is connected to a second modulator output node 156 of the modulation circuit to provide the second comparator output signal VVLY as a set signal VSET to a set input of the output circuit 134. In this example, The generation, by the first offset circuit 140, of the first voltage V1 according to the error voltage signal VER causes the second comparator 160 to perform zero crossing detection for transition mode (TM) operation of the DC-DC converter 104 when the error voltage signal VER is less than the Zener voltage of the Zener diode 141 (e.g., VER≤V2). When the error voltage signal VER is above the Zener voltage (e.g., VER>V2), the valley reference signal VVLY and the corresponding first voltage V1 are greater than 0 V (e.g., VVLY>VSS), and the second comparator 160 will assert the second comparator output signal VVLY in the first state to cause the output circuit 134 to turn the DC-DC converter switch 110 off in a given switching control cycle before the inductor current IL reaches zero, thereby implementing continuous conduction mode (CCM) operation of the DC-DC converter 104.

This implementation advantageously provides smooth transitions between TM and CCM operation as the error voltage signal VER varies according to load changes or other system operating conditions. The output circuit 134 operates according to the signals VPK and VSET from the modulation circuit 130 to turn the switch 110 off to control a peak inductor current in a given switching control cycle, and to turn the switch 110 on to implement transition mode TM or continuous conduction mode CCM operation for the given switching control cycle. In various example implementations, the modulation circuit output 154 generates the signal VSET to cause the output circuit 134 to turn the switch on in response to the earlier one of the first signal VILS decreasing to the reference voltage VSS, or the first signal VILS decreasing to the valley reference signal VVREF. In certain examples, the second comparator 160 implements this operation for TM or CCM operation and smooth transitions therebetween by comparing the voltage amplitudes of the first signal VILS and the valley reference signal VVREF (e.g., where VVREF=V1).

In another example implementation, the modulation circuit 130 includes a second offset circuit to generate a valley reference signal VVREF according to the first voltage signal V1. The second offset circuit in one example includes a first terminal connected to the node 148, and a second terminal connected to a third node 159. As shown in dashed line in FIG. 1, the modulation circuit 130 in one possible implementation includes an offset voltage source 158 that generates the valley reference signal VVREF at the non-inverting input (e.g., node 159) of the second comparator 160 according to (e.g., in response to or based upon) the first voltage V1. In one example, the offset voltage source 158 provides a non-zero DC offset voltage VOS, which is added to the first voltage to create the valley reference signal (e.g., VVREF=V1+VOS). As previously noted, the use of the second comparator 160 to implement both TM and CCM operation with smooth transitions between these modes provides a low cost solution to allow the DC-DC converter 104 to operate in one of multiple modes without the addition of external logic circuitry to detect conditions for mode switching, and separate circuitry to implement the individual operating modes. Certain situations can arise where the current feedback signal is non-ideal with an offset causing false indications of zero or valley transitions, and/or the current feedback signal can include noise, particularly at low currents where transitions to and from TM operation are desirable. For such a situation, the offset voltage source 158 can be tailored to provide the non-zero offset voltage VOS at a level above the expected noise level for the first signal VILS. This approach can be used for any source of the current feedback signal, including sensors as depicted in FIG. 1, as well as inductor current estimation or emulation circuitry (e.g., a current emulator 308 in FIGS. 3, 4, 6 and 7 below). In this implementation, the second comparator circuit 160 generates the second comparator output signal VVLY in the first state to cause the output circuit 134 to turn the DC-DC converter switch 110 off for TM operation in response to the first signal VILS decreasing to or below VSS+VOS. For CCM operation in this implementation, when VER>V2, the second comparator circuit 160 generates the signal VVLY in the first state to cause the output circuit 134 to turn the DC-DC converter switch 110 off in response to the first signal VILS decreasing to or below VREF (e.g., VILS≤(VER−V2+VOS).

In another possible implementation, the modulation circuit 130 in FIG. 1 includes the second offset circuit (e.g., with the offset voltage source 158) to generate a valley reference signal VVREF according to the first voltage signal V1, along with a detection circuit 150. In one example, the detection circuit is a zero current detection (ZCD) circuit (e.g., labeled ZCD CKT in FIG. 1). The detection circuit 150 includes a detection circuit output 152 that provides a detection circuit output signal VZCD in a first state (e.g., HIGH) when the first signal VILS is less than or equal to the reference voltage VSS (e.g., to indicate that the inductor current IL has decreased to or below zero). The detection circuit output 152 in this example provides the detection circuit output signal VZCD in a different second state (e.g., LOW) when the first signal VILS is greater than the reference voltage signal VSS. In one example, the detection circuit 150 includes a further comparator circuit (not shown) that provides the output signal VZCD based on a comparison of the first signal VILS and the reference voltage signal VSS. In one implementation of this example, the detection circuit 150 may provide enhanced noise immunity to implement TM operation compared with the use of the second comparator 160.

In this implementation, moreover, the modulation circuit 130 includes a logic circuit 154 (e.g., and OR gate), with a first input connected to the detection circuit output 152, a second input connected to the second comparator output 162, and an output. The logic circuit output 156 is coupled with the second modulator output node 156 of the modulation circuit 130 to provide the second input signal VSET to the output circuit 134. In this example, the logic circuit 154 of the modulation circuit 130 provides the second input signal VSET in the first state (e.g., HIGH) to cause the output circuit 134 to turn the switch on in the given switching control cycle when either of the detection circuit output signal VZCD or the second comparator output signal VVLY is in the first state (e.g., HIGH). In the illustrated implementation, this turns the switch 110 off in response to an earliest one of the detection circuit output signal VZCD or the second comparator output signal VVLY being in the first state HIGH in the given switching control cycle to implement transition mode TM operation and/or continuous conduction mode CCM operation of the DC-DC converter 104 and transitions between the TM operation and the CCM operation.

In yet another possible implementation, the modulation circuit 130 includes the detection circuit 150, the second comparator 160 and the logic circuit 154, and the second offset circuit (e.g., the offset voltage source 158 is omitted. In this implementation, the detection circuit 150 provides the VZCD signal to the logic circuit 154 to control turn on of the switch 110 in TM operation, and the second comparator 160 provides the second comparator output signal VVLY to control the switch turn on for CCM operation.

The control circuit 102 includes the error amplifier 118 to regulate a desired parameter (e.g., inverter output voltage), and the error amplifier output (e.g., error signal VER) is used as a reference to control inductor current IL during operation of the DC-DC converter. In closed-loop operation, the inductor current oscillates between minimum value and maximum value set by the error amplifier 118. The minimum inductor current value increases smoothly from zero (TM) operation to a positive value (CCM), and the inductor current ripple is proportional to the voltage of the Zener diode 141 (e.g., ripple is proportional to V2). As previously discussed, the inductor current ripple can be set or adjusted in certain implementations, for example, by providing an adjustment signal to the input 143 of the first offset circuit 140. A variety of different offset circuits 140 can be used, for example, including selectable Zener diodes. In one example, the Zener diode 141 is replaced with a controllable voltage, and the ripple amplitude can be adjusted statically or dynamically via the adjustment input signal ADJ. In certain implementations, as described in further examples below, reference voltages that establish either or both of the peak and valley of the inductor current may be limited to certain values in order to provide overload and short circuit protection. In specific implementations, the control circuit 102 further includes a clamp circuit coupled with the output 120 of the amplifier 118 and/or the second offset circuit, in order to clamp the voltage of the error signal VER and/or the voltage of the valley reference signal VVREF.

Figure 2:
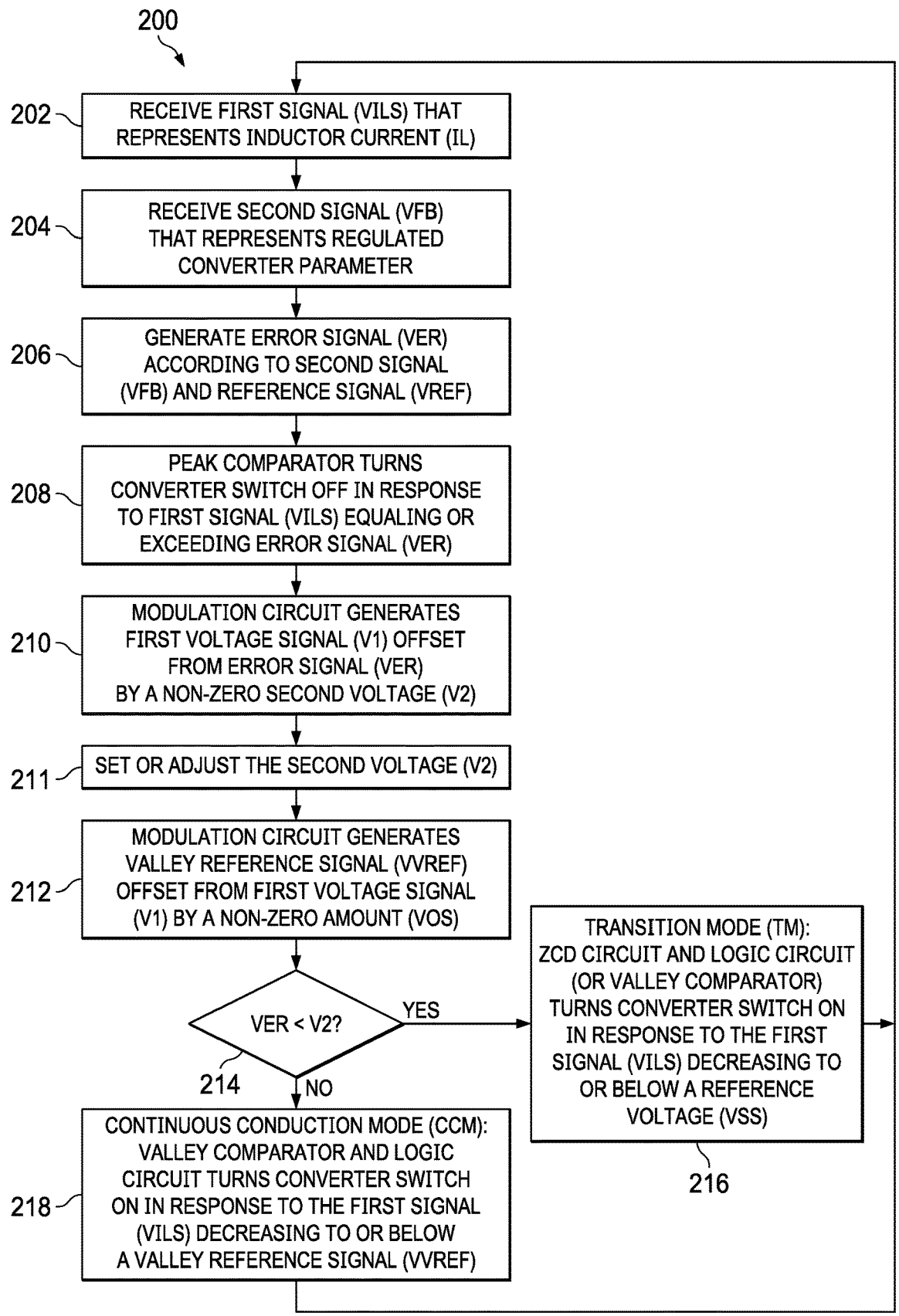
FIG. 2 is a flow diagram of a method to operate a DC-DC converter according to another aspect of the present disclosure.

FIG. 2 shows a method (e.g., process) 200 to operate a DC-DC converter 104 in a given one of a plurality of switching control cycles. In one example, the method 200 is implemented by the control circuit 102 in FIG. 1, and the example method 200 as described in connection with operation of the DC-DC converter 104 as described above. Other implementations are possible using different converter circuits and control circuitry. The method 200 includes receiving a first signal at 202 that represents an inductor current of the DC-DC converter (e.g., sensor signal VILS that represents the inductor current IL in FIG. 1), as well as receiving a second signal at 204 that represents a regulated converter parameter (e.g., VFB) that represents the output voltage VOUT of the DC-DC converter 104). The method 200 also includes generating an error signal at 206 (e.g., VER) that represents the difference (e.g., error) between a reference signal (e.g., VREF) and the second signal VFB. In the example of FIG. 1, the amplifier 118 provides the At 208, the method 200 also include turning a DC-DC converter switch (e.g., switch 110) off to control a peak inductor current. One example includes turning the switch 110 off at 208 when (e.g., in response to) the first signal equals or exceeds the error signal. In the example of FIG. 1, the amplifier 118 generates the error signal VER according to the difference between the signals VREF and VFB. The method at 210 further includes generating a first voltage signal that is offset from the error signal by a non-zero second voltage. In FIG. 1, the offset circuit 140 generates the signal V1 at the node 148 that is offset from VER by the non-zero second voltage V2. One example of the method 200 also includes setting or adjusting the non-zero second voltage V2 at 211, for example, by providing the adjust signal ADJ to the input 143 of the first offset circuit 140 in FIG. 1. In other examples, the setting or adjusting at 211 can be omitted.

At 212, the method 200 includes generating a valley reference signal according to the first voltage signal. The direct connection of the node 148 to the non-inverting input of the second comparator 160, or the use of the offset voltage source 158 (VOS), generates a valley reference signal VVREF in the example of FIG. 1 according to the first voltage signal V1. In one example generating the valley reference signal at 212 includes offsetting the valley reference signal VVREF from the first voltage signal V1 by a non-zero amount VOS.

The example method 200 further includes turning the converter switch on at 214-218 according to the error signal amplitude in the given switching control cycle. One example includes turning the switch on in response to the earlier of the first signal (e.g., VILS, that represents the inductor current IL of the DC-DC converter 104) decreasing to or below a reference voltage (e.g., VSS) for transition mode TM operation (e.g., including TM, DCM and/or burst operation), or the first signal decreasing to or below the valley reference signal (e.g., VVREF) for CCM operation of the DC-DC converter 104. In one implementation, if the error signal is less than the second voltage (e.g., VER<V2, YES at 214), the ZCD circuit (150 in FIG. 1, where included) and the logic circuit (e.g., 154, where included) causes the output circuit 134 to turn the converter switch on at 216 in response to the first signal decreasing to or below the reference voltage (e.g., in response to the VILS≤VSS, or VILS≤VVREF for VVREF=VSS). In this implementation, if the error signal is greater than or equal to the second voltage (e.g., VER≥V2), the second comparator 160 (and the logic circuit 154, if included) causes the output circuit 134 to turn the converter switch on at 218 in response to the first signal decreasing to or below the valley reference signal.

The method 200 then repeats the processing at 202 through 216, 218 for subsequent switching control cycles to selectively implement TM or CCM operation in each individual switching control cycle to operate the DC-DC converter 104, including switching (e.g., at 214) between the TM operation 216 and the CCM operation 218 according to relative values of the error signal VER and the non-zero second voltage V2. The examples illustrated and described in connection with FIGS. 1 and 2 provide improved control circuits and processes for PWM converters of any form or topology. These examples facilitate CCM/TM multimode operation with seamless mode transition. The examples of FIGS. 3, 4, 6 and 7 below advantageously combine peak current control of the inductor current with valley current control of an emulated inductor current signal to operate in TM or CCM with seamless mode transition. The described example modulator circuits avoid or mitigate the need for a compensating ramp in CCM operation, and also provide robust overload protection. The described modulation circuits 130 and control circuits 102 improve system efficiency and robustness by efficient switching between TM and CCM operation. The described modulation circuits 130 and control circuits 102 also simplify system and control design by using the same modulation circuitry for both modes. In addition, the described modulation circuits 130 and control circuits 102 can be advantageously employed to operate any form or topology of DC-DC converter.

Figure 3:
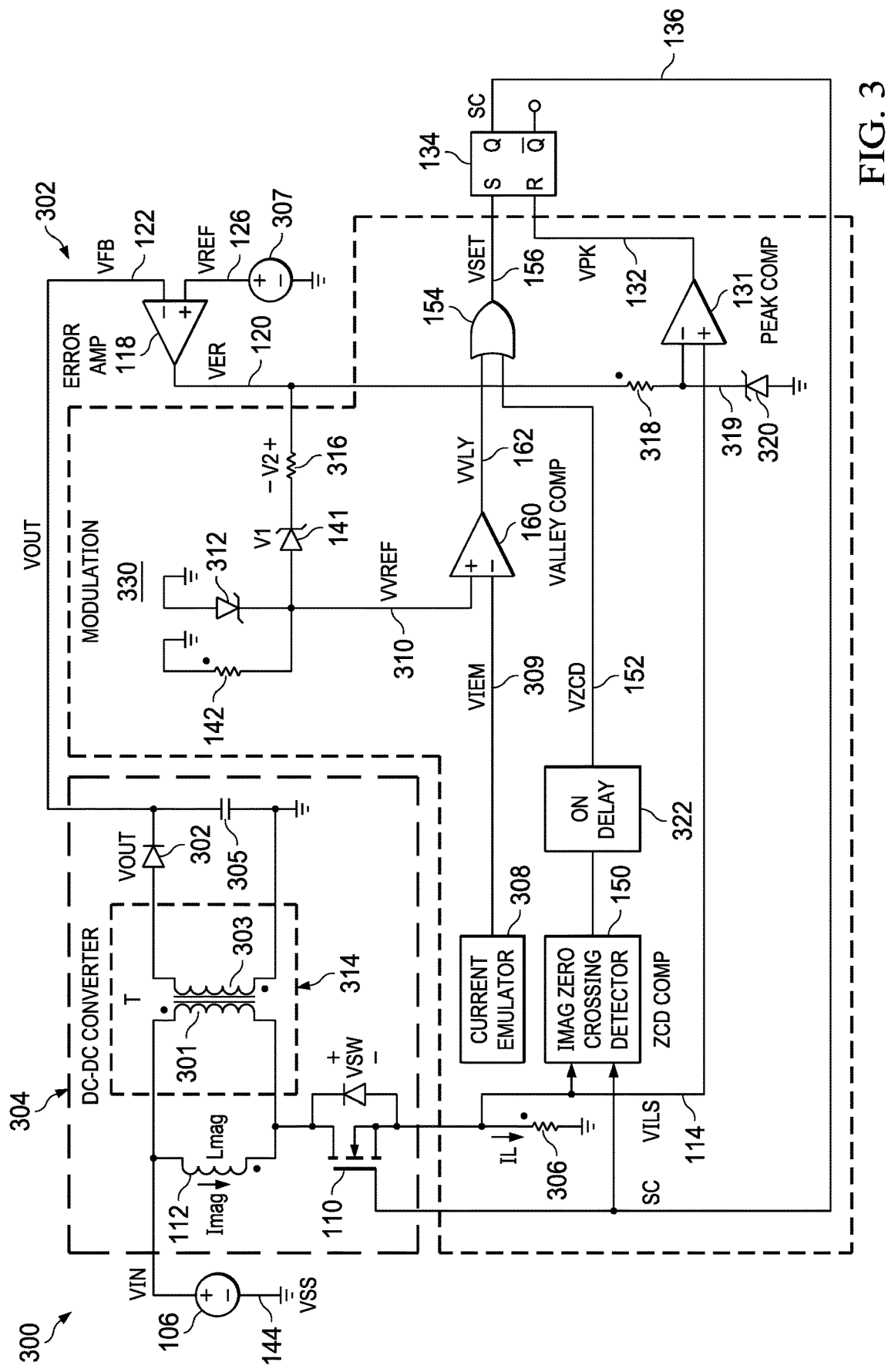
FIG. 3 is a schematic diagram of a flyback DC-DC converter that includes another example modulation circuit embodiment.
Figure 4:
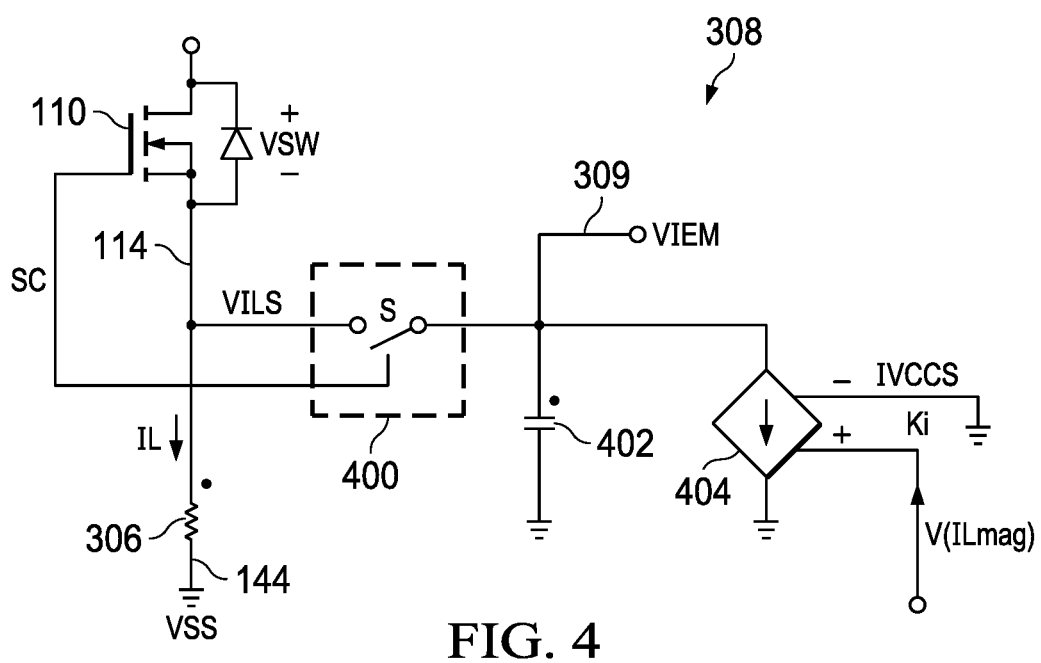
FIG. 4 is a schematic diagram of an example current emulator in the modulation circuit example of FIG. 3.
Figure 5:
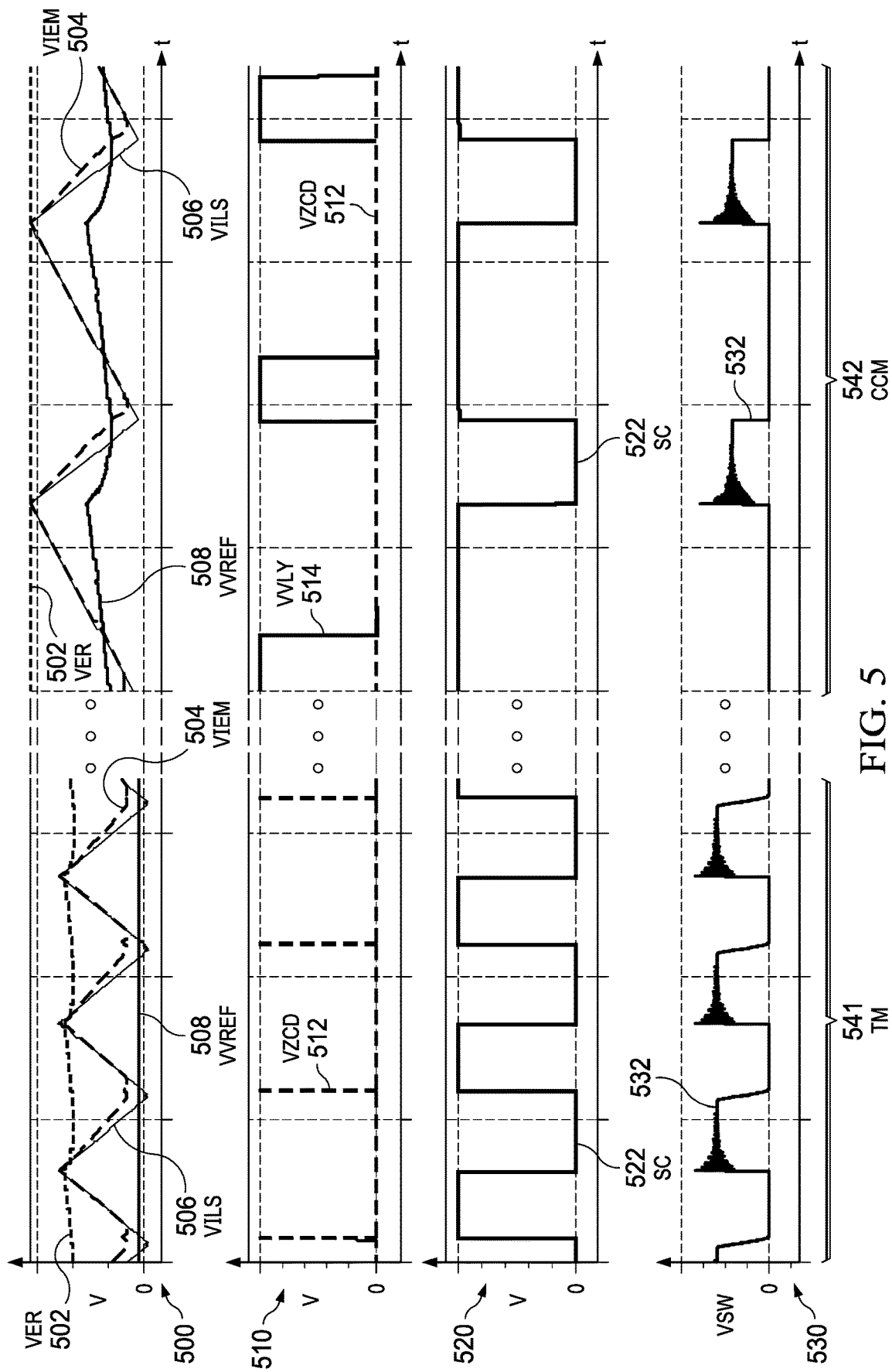
FIG. 5 is a signal diagram of signal waveforms in the flyback DC-DC converter of FIG. 3.

FIGS. 3-5 show an example flyback DC-DC converter implementation using the concepts of the control circuit 102 of FIG. 1 with a flyback DC-DC converter 304. FIG. 3 shows a flyback DC-DC conversion system 300 that includes a control circuit 302 with another example modulation circuit embodiment 330. FIG. 4 shows an example current emulator circuit in the modulation circuit example of FIG. 3. FIG. 5 is a signal diagram of signal waveforms in the flyback DC-DC converter of FIG. 3. The DC-DC converter 104 in FIG. 3 includes a transformer 314 with a primary circuit shown as a primary winding 301 and a magnetizing inductor 112 with a magnetizing inductance Lmag. A secondary circuit includes an output rectifier diode 302 in series with a secondary winding 303. An output capacitor 305 is connected between the cathode of the diode 302 and the reference voltage node 144 (e.g., VSS). The converter switch 110 is connected in series with the primary circuit and a sense resistor 306. The sense resistor 306 is coupled with the circuit node 114 to provide the first signal VILS to the non-inverting input of the first comparator 131. The switch 110 controls the primary current IL including the magnetizing current Imag. The output voltage across the capacitor 305 is coupled to provide a voltage feedback signal VFB to an inverting input of the error amplifier 118. The error amplifier 118 provides the error signal VER that represents the difference between the feedback signal VFB and the reference signal from a reference source 307.

The example modulation circuit 130 in FIG. 3 receives the error signal VER from the amplifier 118 at the amplifier output 120. In addition, like the example in FIG. 1, the modulation circuit 330 in FIG. 3 provides the first and second input signals VPK and VSET to cause the output circuit 134 to respectively turn the converter switch 110 off and on in a succession of switching control cycles. The modulation circuit 330 includes a current emulator circuit 308 with an output 309 that provides a voltage signal VIEM that represents an emulated inductor current value.

The modulation circuit 330 includes a first offset circuit as described above, including a Zener diode 141 and a resistor 142. The control circuit in this example also includes clamp circuitry 312, 318 and 320 coupled with the output 120 of the amplifier 118 and with the second offset circuit, to clamp a voltage of the error signal VER and the valley reference signal VVREF. In this example, the modulation circuit 330 includes a node 310 that connects the anode of the Zener diode 141 and the resistor 142. The resistor 142 is connected between the node 310 and the reference voltage node (e.g., ground). The clamping circuit in this example includes a second Zener diode 312 with an anode connected to the node 310 and a cathode connected to the reference voltage node to clamp the voltage of the valley reference signal VVREF at the node 310. A resistor 316 is coupled between the amplifier output 120 and the cathode of the Zener diode 141. The voltage V1 at the Zener cathode is substantially equal to the error signal voltage VER while the Zener diode 141 is not conducting (e.g., while (V1−VVREF)≤the Zener voltage of the diode 141). For increased values of VER, the valley reference signal voltage VVREF increases to a maximum value set by the Zener voltage of the second Zener diode 312.

The second (e.g., valley) comparator 160 compares the voltage signal VIEM from the current emulator circuit 308 with the valley reference signal VVREF and provides the VVLY signal at a first input of the logic circuit (e.g., OR gate) 154 in a first state (e.g., HIGH) in response to the voltage signal VIEM decreasing to or below the valley reference signal VVREF. This example also includes a ZCD circuit 150 that asserts an output signal in response to the magnetizing current Imag decreasing to or below the reference voltage (e.g., VSS). In one example, a delay circuit 322 delays the output signal from the ZCD circuit 150 and provides a delayed signal to the second input of the logic circuit 154. In this example, the logic circuit 154 provides the second input signal VSET to the output circuit 134 in response to the earlier one of the zero crossing detection signal VZCD and the output signal VVLY from the valley comparator 160.

A resistor 318 is coupled between the output of the amplifier 118 and a node 319 at the inverting input of the first (e.g., peak) comparator 131. A third Zener diode 320 is connected between the node 319 and the reference voltage node. The comparator 131 provides the signal VPK at the first modulation circuit output 132 to turn the switch 110 off in response to the first signal VILS exceeding a voltage at a node 319. The voltage at the node 319 is set to the error signal voltage VER for low error signal voltages. Once the error signal voltage reaches the voltage of the Zener diode 320, the voltage at the node 319 remains generally constant.

The converter of FIGS. 3-5 can operate in one or more of CCM, DCM, and transition or quasi resonant (QR) modes. The control circuit 102 in various implementations regulates the output voltage (or current) of the PWM converter 304 by modulating either the maximum current or the minimum current in the magnetizing inductance Lmag of the transformer primary. The control circuit 102 generates peak and valley current references which are limited to appropriate maximum values by the clamping circuitry (e.g., Zener diode 320 for the peak current, and Zener diode 141 for the valley current). In the example of FIGS. 3-5, depending on the output power demand, the control circuit 302 turns the converter switch 110 on when the inductor valley current crosses zero or when the inductor valley current is decreases to or below the reference represented by the VVREF signal generated by the error amplifier 118. In one implementation, the control circuit turns the switch 110 on in response to the current crossing zero after a non-zero delay time via the delay circuit 322 to obtain performance referred to as "valley switching". When the switch 110 is turned on in response to the valley current crossing zero, the converter 304 operates in the TM-QR mode.

FIG. 4 shows an example current emulator circuit 308 that can be used in the modulation circuit example 330 of FIG. 3. As discussed above, the converter switch 110 is connected in series with the resistor 306 between the primary circuit of the transformer 314 and the reference voltage node 144. The sense resistor 306 provides the first signal VILS as a voltage that represents the inductor current IL. The current emulator circuit 308 includes a switch 400 that operates according to the switching control signal SC to selectively connect/disconnect the signal VILS to/from the emulator circuit output 309. The switch 400 in this example is turned on one the converter switch 110 is turned on, and the switch 400 is turned off when the converter switch 110 is turned off. A capacitor 402 is connected between the switch and the reference voltage node (e.g., VSS), and a voltage controlled current source 404 is connected in parallel with the capacitor 402. The current source 404 converts the voltage at the emulator output circuit 309 to a current V(ILmag) that provides a discharge current to discharge the capacitor 402 at a controlled discharge rate when the switch 400 is turned off.

When the switch 400 is turned on, the switch 400 applies the shunt voltage to the capacitor 402, which creates a replica of the inductor Lmag current Imag charging the capacitor 402. After the switch 400 is turned off, the capacitor 402 is discharged by the voltage controlled current source 404. The voltage controlled current source 404 in one example has a configured voltage to current conversion factor Ki selected to make the discharge current proportional to the voltage across inductor Lmag (e.g., V(Lmag)) This causes the voltage on the capacitor 402 to decay at a rate equal to that of the current in the DC-DC converter inductor (112). In operation, the voltage signal VIEM across the capacitor 402 represents the inductor current IL. In certain implementations, the conversion factor Ki is selected such that the decay rate of the voltage of the capacitor is slightly lower than the decay rate of the inductor current in consideration of circuit parameter tolerances in a given system.

FIG. 5 shows a signal diagram of signal waveforms for both TM and CCM operation in different switching control cycles of the flyback DC-DC converter of FIG. 3. FIG. 5 includes a graph 500 and error signal curve 502 (VER), and emulated inductor current signal curve 504 (VIEM), a first signal curve 506 that represents the sensed inductor current IL (VILS), and a valid voltage reference signal curve 508 (VVREF). A graph 510 in FIG. 5 includes a curve 512 that illustrates the detection circuit output signal VZCD during TM operation, and a curve 514 that shows the second comparator output signal VVLY during CCM operation. FIG. 5 also includes a graph 520 with a switching control signal curve 522 (SC), and a graph 530 with a curve 532 that shows the drain-source voltage VSW of the converter switch 110. The graph 500, 510, 520 and 530 illustrate voltages of the example represented signals, including a first portion 541 representing operation during switching control cycles in which the control circuit 102 operates the converter 104 in transition mode, and a second portion 542 during CCM switching control cycles. In operation, the valley turn on signal (curve 514) is generated by comparing the output signal VIEM of the current emulator circuit 308 (curve 504) to the VVREF reference signal (curve 508). The downslope of the current emulator signal VIEM in one example is set to be lower than the downslope of the actual inductor current. In one example, the VZCD signal precedes the VVLY signal when the VVREF signal is zero (e.g., during TM operation before the Zener diode 141 conducts).

As with the example of FIG. 1 above, transitions between TM and CCM operation in the example of FIGS. 3-5 occur seamlessly as the output error signal VER of the error amplifier 118 moves up and down as the output power demand increases or decreases. For low output power demand (e.g., TM operation at 541 in FIG. 5), the error signal VER is lower than the breakdown voltage of the Zener diodes 141, 312 and 320. As a result, the value of the valley reference signal VVREF is zero, and the value of the peak comparator reference at the node 319 is equal to the error signal voltage VER. In this condition, the control circuit 102 operates in TM mode to turn the switch 110 on after the inductor current IL crosses zero. In addition, the control circuit 102 turns the switch 110 on at a peak value modulated by the error amplifier 118 according to the regulated converter operating parameter (e.g., output voltage VOUT). In one example, the control circuit 302 operates the DC-DC converter 104 in the TM-QR mode at a frequency that increases as the load decreases due to the closed loop regulation of the output voltage VOUT. If the switching frequency becomes excessive, the self-oscillation of the converter may be interrupted and the operating frequency can be limited by suitable techniques and circuitry (not shown).

As the load demand increases, the error signal VER increases, and eventually exceeds the Zener voltage of the Zener diode 141. With the peak current IL of the inductor 112 limited by the Zener diode 141, the converter output voltage VOUT will decrease and the inductor current IL will become continuous and the ZCD signal will stay low (e.g., curve 512 during CCM operation at 542 in FIG. 5). The error signal voltage VER increases until it exceeds the breakdown voltage of the Zener diode 312, and the valley reference voltage signal VVREF at the node 310 will increase. The increase in the VVREF signal leads to the switch 110 being turned when the emulated current signal VIEM decreases to or below VVREF.

Further load increases cause an increase in the valley reference signal VVREF, causing the inductor valley current and the average inductor current to increase until the power delivery to the output load (108 in FIG. 1) balances the load demand and the error amplifier output voltage signal VER stabilizes at a new operating point. In this example, the control circuit 302 operates the DC-DC converter 304 in CCM at a frequency that increases as the load demand increases. In this example, moreover, the circuit is self-oscillating, there is no possibility for sub-harmonic oscillation and thus no need for a compensating ramp (e.g., otherwise used in fixed frequency operating converters). Further load increases can lead to clamping of the VVREF signal at a voltage that corresponds to the Zener voltage of the second Zener diode 312. From this point on the inductor current IL oscillates between the maximum peak and valley values set by the Zener diodes 320 and 141, respectively, and the average current in the inductor 112 will stabilize at a value that corresponds to the average of the maximum peak and valley references values.

The control circuit 302 in FIG. 3 also facilitates robust overload and short circuit protection. Unlike fixed frequency converters where the minimum on time of the switch may be too long to provide adequate short-circuit protection, the frequency of the example circuitry 302 decreases as a short-circuit is applied, thereby avoiding or mitigating the need for very short on times. In addition, the disclosed examples facilitate smooth CCM and TM multimode operations with seamless mode transitions therebetween. The example modulation circuit 330 of FIG. 3 combines peak current control of the inductor current IL (e.g., via the first signal VILS) with valley current control of an emulated inductor current (e.g., via the emulated signal VIEM) to operate in TM mode or CCM mode with seamless mode transition. This example, moreover mitigates or avoids the need for a compensating ramp in CCM mode and provides robust overload protection, while simplifying the overall system and control design and reducing cost.

Figure 6:
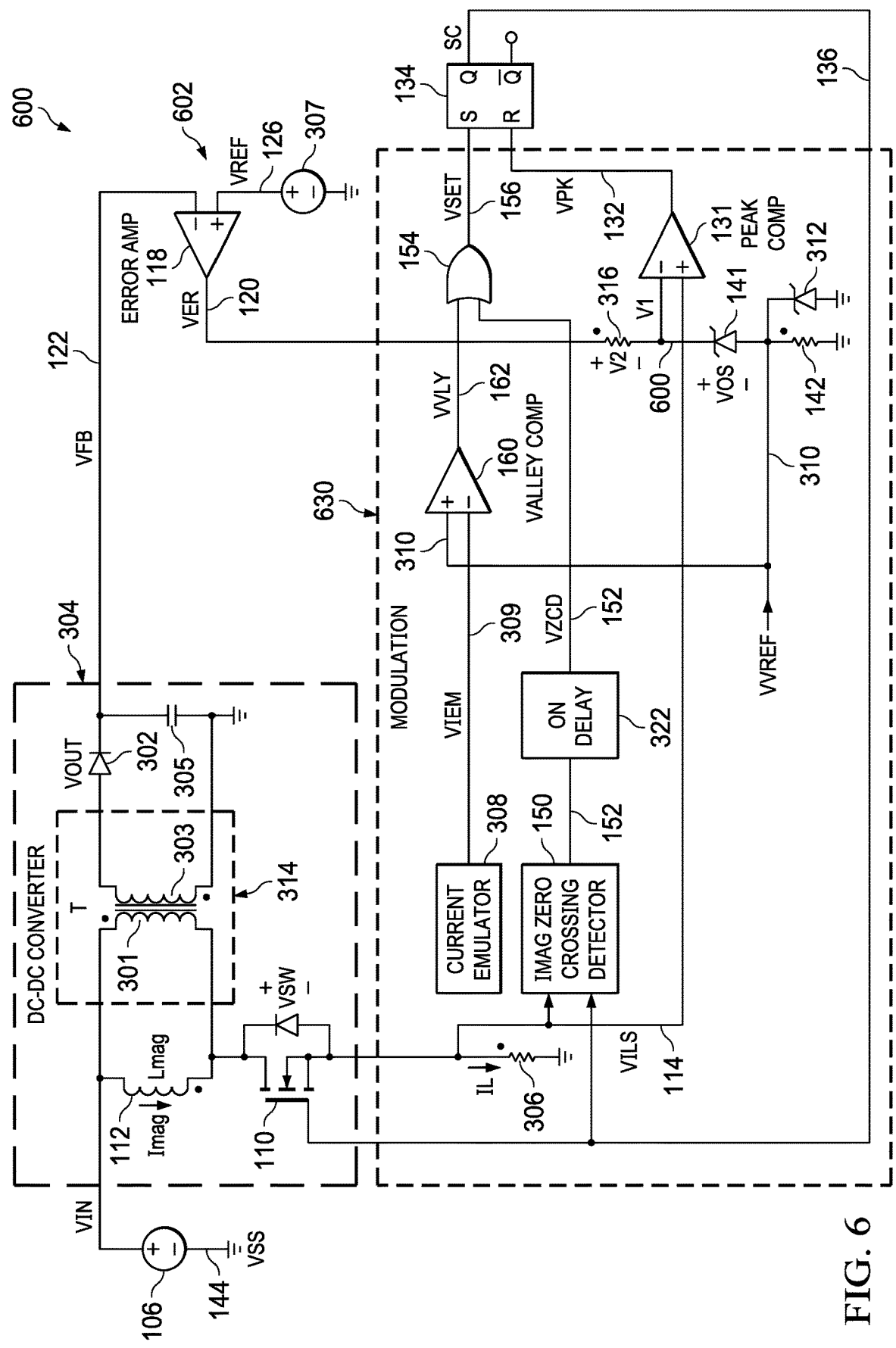
FIG. 6 is a schematic diagram of another flyback DC-DC converter that includes another example modulation circuit embodiment.

FIG. 6 shows another flyback DC-DC conversion system 600 with a control circuit 602 that includes another example modulation circuit 630 and a flyback DC-DC converter 304. Like the example of FIGS. 3-5, the modulation circuit 630 in FIG. 6 includes a clamp circuit (e.g., 312, 318 and 320) to clamp the voltages of the error signal VER and the valley reference signal VVREF. In this example, the valley comparator interconnections are similar to those in FIG. 3, and the peak comparator connections are modified. In particular, the Zener diode 320 is omitted in FIG. 6, and the inverting input of the peak comparator 131 is connected to a node 600 that joins the cathode of the Zener diode 141 and the resistor 316. The modulation circuit 630 in FIG. 6 supports simultaneous modulation of both the peak and valley inductor current levels to provide enhanced performance flexibility. As long as the error signal VER is lower than the breakdown voltage of the Zener diode 312, the voltage across the resistor 142 (e.g., VVREF) is zero and the converter 304 operates in TM-QR mode. When the error signal VER exceeds the breakdown voltage of the Zener diode 312, the excess voltage develops across the resistor 142 and the converter 304 enters CCM operation. In this implementation, the reference voltage V1 for peak control increases together with the valley reference signal VVREF. This implementation limits the increase in frequency resulting from the converter 104 operating deep in CCM (e.g., for fairly large error signal values and fairly large valley reference signal levels) in order to regulate the output voltage VOUT.

Figure 7:
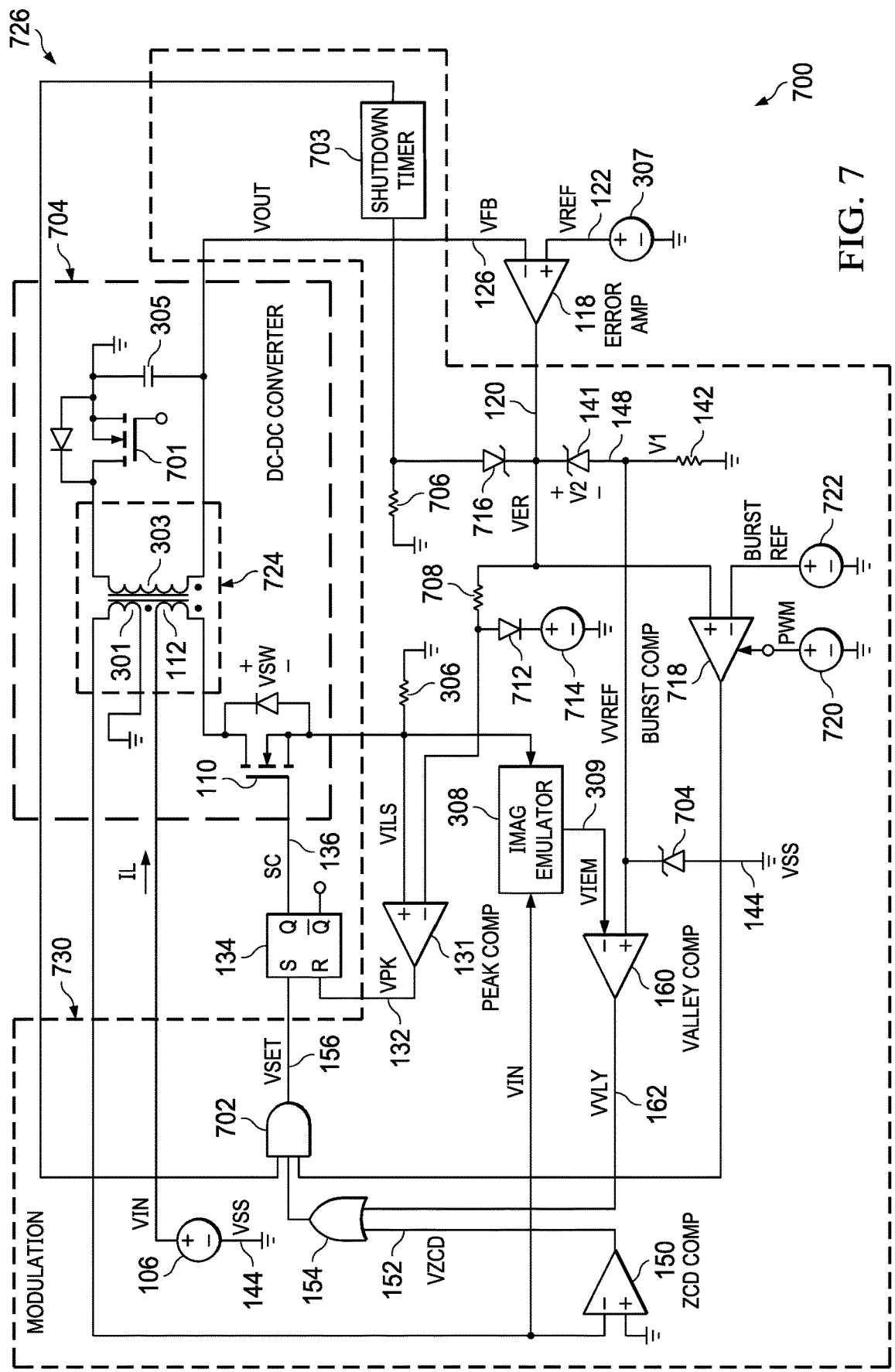
FIG. 7 is a schematic diagram of a further example flyback DC-DC converter with a modulation circuit according to another embodiment.

FIG. 7 shows a further example flyback DC-DC conversion system 700 that includes a control circuit 726 with a modulation circuit 730 according to another embodiment. A DC-DC converter 704 in this example includes a transformer 724 with the first primary winding 301 and the second primary winding 112 connected in series with the converter switch 110. The secondary circuit in this example includes the secondary winding 303 and the output capacitor at 305 as previously described. A secondary side switch 701 is provided between one end of the secondary winding 303 and a reference voltage node (e.g., ground). The capacitor 305 is connected between the reference voltage node and the output terminal to provide the output voltage VOUT. The output circuit 134 provides the switching control signal SC to operate the converter switch 110 to control the current IL through the inductor winding 112. The converter switch 110 is turned on in successive switching control cycles according to the VSET signal from the output 156 of the modulation circuit 130.

In this example, a three input AND gate 702 provides the VSET signal according to an input from the OR gate 154 as well as inputs from a first comparator 718 and a shutdown timer circuit 703. In this example, a zero crossing detection comparator 150 (labeled ZCD COMP in FIG. 7) provides the VZCD signal to a first input of the OR gate 154, and the valley comparator 160 provides the VVLY signal to the second OR gate input as previously described. A magnetizing current emulator circuit 308 provides the emulator current signal VIEM to the valley comparator inverting input, and the comparator 160 compares the VIEM signal with a valley reference signal VVREF. The Zener diode 312 clamps the valley reference signal VVREF with respect to the reference voltage node 144 (VS S).

The shutdown timer circuit 703 monitors the voltage across a resistor 706 at a node connected to the anode of another Zener diode 716. The cathode of the Zener diode 716 is connected to the error amplifier output node 120. For levels of the error signal VER below the breakdown voltage of the Zener diode 716, no current flows through the resistor 706 and the shutdown timer circuit 703 provides a signal to enable the AND gate 702. If the error signal VER exceeds the breakdown voltage of the Zener diode 716, current flows in the resistor 706 and raises the voltage at the shutdown timer circuit input. This causes the circuit 703 to disable the AND gate 702 after a non-zero delay time.

The peak comparator 131 provides the VPK signal to turn the converter switch off when the current signal VILS meets or exceeds a peak reference signal that is set by a reference 714 and a diode 712. In this example, the peak reference voltage also varies according to the error signal VER through connection of a resistor 708 between the error amplifier output node 120 and the inverting (−) input of the peak comparator 131. The valley reference signal VVREF at the node 148 is set by the offset circuit including the Zener diode 141 and the resistor 142 according to the error signal VER as described above, and is clamped in one implementation by the Zener diode 312.

The example of FIG. 7 provides burst mode control circuitry, including a comparator 718 (labeled BURST COMP in FIG. 7). The burst comparator 718 enables the AND gate 792 to allow the converter switch 110 to be turned on by the OR gate 154 when the error voltage is greater than or equal to a burst reference voltage signal BURST REF provided by a voltage source 722 and when a burst modulation signal PWM is provided in a first state (e.g., HIGH) by a modulation source 720. This example provides operation in one some or all of TM-QR, TM-QR burst or light CCM modes in different switching control cycles for low system losses. This example also provides reduced transformer size and switching frequency span, where the control circuit 726 provides hysteretic control of the magnetizing current which oscillates between peak and valley levels that are modulated by the error amplifier 118 for CCM operation. When the valley current is zero, the converter 704 is operated in QR/TM. In addition, the control circuit 726 operates the converter 704 in burst mode when the error signal VER decreases to or below the peak current value set by the burst reference source 722, where the number of pulses per burst is set by a dead band of the PWM signal source 720. Moreover, like the above examples, the control circuit 726 in FIG. 7 provides seamless TM/QR to CCM to TM/QR transitions. In one implementation, the magnetizing current is sampled while the converter switch 110 is on and is emulated by the circuit 308 while the switch 110 is off. In one example, the slope of the emulated current signal set lower than that of the actual magnetizing current. This example also facilitates overload/short circuit protection, and the hysteretic current mode control limits short circuit current to a safe value. The example control circuit 726 of FIG. 7 further controls the volt x second balance of the DC-DC converter 104, provides improved efficiency through switching frequency reduction, facilitates start up with any value capacitive or motor loads, and mitigates or avoids error amplifier saturation by incorporating the shutdown timer circuit 703.

Figure 8:
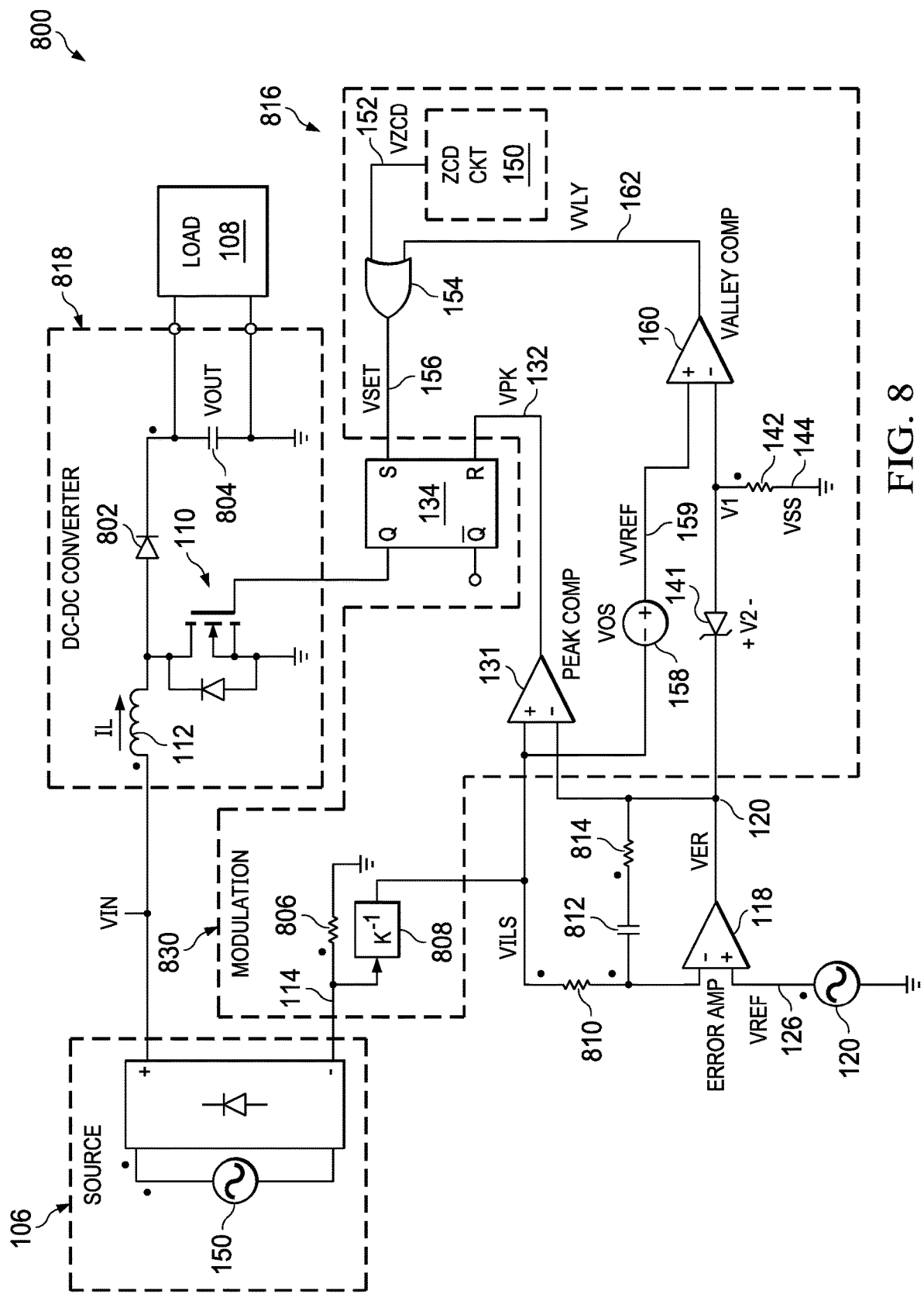
FIG. 8 is a schematic diagram of an example boost DC-DC converter with another example modulation circuit according to a further embodiment.
Figure 9:
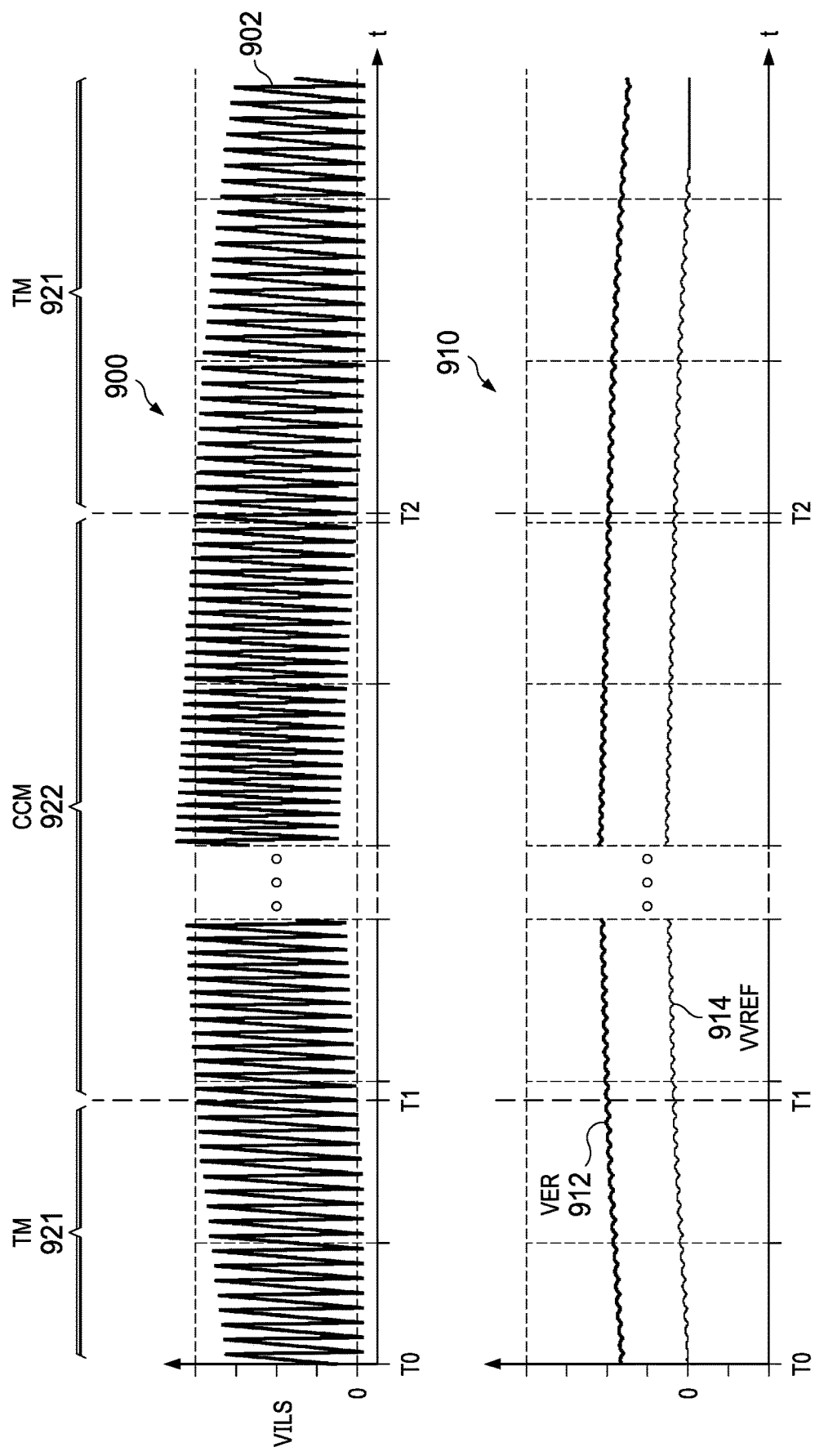
FIG. 9 is a signal diagram of signal waveforms in the boost DC-DC converter of FIG. 8.

Referring now to FIGS. 8 and 9, FIG. 8 shows an example boost DC-DC conversion system 800 with a control circuit 816 and another example modulation circuit 830 according to a further embodiment. FIG. 9 provides a signal diagram with graphs 900 and 910 showing signal waveforms in the system 800 of FIG. 8. The DC-DC converter 804 is a boost converter in this example, which includes an inductor 112 with a low side converter switch 110 and an output diode 802 that provides an output voltage signal VOUT across an output capacitor 804 to power a load 108. A modulation circuit 830 in this example includes a resistor 806 coupled between the negative source terminal and the reference voltage node 144 (e.g., VSS or circuit ground). The voltage signal at the terminal or node 114 of the resistor 806 provides an input signal to a sample and hold circuit 808 (e.g., labeled $K^{-1}$) that generates the first signal VILS that represents the inductor current IL. The peak comparator 131 compares the first signal VILS to the error signal VER to generate the VPK signal to turn the converter switch 110 off as previously described. The inverting input of the error amplifier 118 is coupled to the output of the sample and hold circuit 808 through a resistor 810. An RC feedback circuit with a capacitor 812 and a resistor 814 is coupled between the inverting input and the output 120 of the error amplifier. As in the example modulation circuit 130 of FIG. 1 above, the modulation circuit 830 in FIG. 8 may include a ZCD circuit 150 and the logic circuit 154 as shown. In another example, the circuits 150 and 154 are omitted, and the valley comparator output 162 is connected to directly provide the VSET signal to the output circuit 134. The non-inverting (+) input of the valley comparator 160 receives the valley reference signal VVREF that is offset from the first signal VILS by the voltage VOS of the source 158. The first voltage signal V1 provided to the inverting (−) input of the valley comparator 160 is generated by the first offset circuit that includes the series connection of the Zener diode 141 and the resistor 142 between the error signal VER and the reference voltage node 144 (VSS).

The control circuit 816 in FIG. 8 operates as described above for TM and CCM operation, with smooth transitions therebetween, as shown in FIG. 9. The graph 900 in FIG. 9 includes a first signal curve 902 (VILS) that is hysteretically controlled by turning the converter switch 110 on and off to transition the inductor current IL between a peak and a valley in each switching control cycle. The graph 910 shows a corresponding error signal curve 912 (VER) and a valley reference signal curve 914 (VVREF). In this example, the control circuit 102 operates in transition mode (TM, designated 921 in FIG. 9) as the error signal curve 912 rises from T0 to T1, the valley reference curve 912 also rises. At T1, the control circuit 102 transitions to continuous conduction mode (CCM, designated 922 in FIG. 9) and the corresponding valleys in the first signal curve 902 (VILS) transition above zero. At T2 in FIG. 9, operation transitions back to TM 921. The circuit 102 in this example provides average current loop operation, in which pulse width modulation is obtained by hysteretic oscillation of the inductor current IL between peak and valley values controlled by the average CMC error amplifier 118. In this example, the valley reference signal (curve 914) is zero for TM and positive for CCM.

As long as the output voltage signal VER of the error amplifier 118 is lower than the voltage of the Zener diode 141, the valley reference signal curve 914 (VVREF) is zero or close to zero (e.g., within one or two percent of the signal span of the valley reference signal voltage). In this example, moreover, the valley comparator transition will lag after the ZCD signal, due to the presence of the offset voltage VOS. In one example operation, the output circuit SR flip-flop 134 is set by the VZCD signal and reset by the peak current comparator 160. In TM operation, the inductor current oscillates between zero and a peak value. As the output power demand increases, the error signal will exceed the voltage of Zener diode 141 plus the offset voltage VOS. The valley comparator 160 generates a set signal VVLY while the inductor current IL is still positive, and the inductor current oscillates hysteretically between the peak and valley values as determined by the amplitude of the current error amplifier output signal VER oscillating with non-zero hysteresis between the peak and valley current reference signals. In this example, the amplitude of the inductor current ripple corresponds to the value of the Zener voltage of the Zener diode 141. As discussed above, in certain examples, the first offset circuit can be adjustable. Modulation of the Zener voltage of the diode 141, for example, allows management of the amplitude and the frequency of the inductor ripple current, thereby providing additional degrees of freedom for management of the inductor losses. The maximum average output current of the converter 104 can be limited by clamping the values of the peak and/or valley voltage references as previously discussed.

Disclosed examples facilitate multimode operation including CCM and burst mode operation at very light loading, with automatic mode selection for best efficiency profile (e.g., line regulation, load regulation, etc.) to reduce system losses, transformer size, and switching frequency span. The certain implementations, moreover, are programmable or configurable to suit a specific application, including adjustable offset circuitry (e.g., 140 in FIG. 1). In certain examples, the inductor current (e.g., magnetizing current) oscillates between peak and valley values which are modulated by the error amplifier 118.

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

What is claimed is:

1. A control circuit to operate a switch of a DC-DC converter, the control circuit comprising:
an output circuit configured to turn the switch off according to a first input signal, and turn the switch on according to a second input signal in successive switching control cycles to convert an input signal to an output signal; and
a modulation circuit, configured to selectively operate the DC-DC converter, in a given switching control cycle, in one of a transition mode (TM) operation and a continuous conduction mode (CCM) operation according to: an error signal that represents a difference between a reference signal and a second signal that represents a controlled parameter of the DC-DC converter; and a first signal that represents an inductor current of the DC-DC converter; the modulation circuit being configured, for a given switching control cycle, to:
provide the first input signal to cause the output circuit to turn the switch off in the given switching control cycle, when the first signal is greater than or equal to the error signal; and
provide the second input signal to cause the output circuit to turn the switch on in the given switching control cycle in response to an earlier one of: the first signal decreasing to a reference voltage that represents a zero crossing of the inductor current for the TM operation; and the first signal decreasing to a valley reference signal that represents a non-zero value of the inductor current for the CCM operation.

2. The control circuit of claim 1, further comprising:
a first offset circuit configured to generate a first voltage signal offset from the error signal by a non-zero second voltage; and
a second offset circuit configured to generate the valley reference signal offset from the first voltage signal by a non-zero offset voltage.

3. The control circuit of claim 2, wherein the second offset circuit is configured to set or adjust the non-zero second voltage.

4. The control circuit of claim 1, wherein the modulation circuit includes:
a first comparator configured to: provide the first input signal to cause the output circuit to turn the switch off, when the first signal equals or exceeds the error signal;
a detection circuit configured to: provide a detection circuit output signal in a first state when the first signal is less than or equal to the reference voltage; and provide the detection circuit output signal in a second state when the first signal is greater than the reference voltage;
a second comparator, including a second comparator output configured to: provide a second comparator output signal in a first state when the first signal is less than or equal to the valley reference signal; and provide the second comparator output signal in a second state when the first signal is greater than the valley reference signal; and
a logic circuit, configured to provide the second input signal to cause the output circuit to turn the switch on in the given switching control cycle when either of the detection circuit output signal and the second comparator output signal is in the first state.

5. The control circuit of claim 4, wherein the logic circuit provides the second input signal in the first state in response to an earliest one of the detection circuit output signal and the second comparator output signal transitioning to the first state in the given switching control cycle to implement the TM operation and/or the TM operation and the CCM operation in successive switching control cycles.

6. The control circuit of claim 1, further comprising a clamp circuit configured to clamp a voltage of the error signal or the valley reference signal.

7. The control circuit of claim 1, wherein the modulation circuit includes:
comparator circuitry configured to provide the first input signal to cause the output circuit to turn the switch off when the first signal equals or exceeds the error signal, provide a second comparator output signal in a first state when the first signal is less than or equal to the valley reference signal, and provide the second comparator output signal in a second state when the first signal is greater than the valley reference signal.

8. The control circuit of claim 1, wherein the modulation circuit includes:
a detection circuit configured to provide a detection circuit output signal in a first state when the first signal is less than or equal to the reference voltage, and provide the detection circuit output signal in a second state when the first signal is greater than the reference voltage;
wherein the second input signal is provided based in part on the state of the detection circuit output signal.

9. A method to operate a DC-DC converter, the method comprising:
by a modulation circuit, turning a DC-DC converter switch off to control a peak inductor current in each of a plurality of switching control cycles;
generating a first voltage signal that is offset from an error signal by a non-zero voltage value;
generating a valley reference signal according to the first voltage signal;
by the modulation circuit, turning the switch on in each switching control cycle, in response to an earliest one of:
a first signal that represents an inductor current of the DC-DC converter decreasing to or below a reference voltage for transition mode operation of the DC-DC converter, the reference voltage representing a zero crossing of the inductor current; and
the first signal decreasing to or below the valley reference signal for continuous conduction mode operation of the DC-DC converter, the valley reference signal representing a non-zero value of the inductor current.

10. The method of claim 9, wherein generating the valley reference signal includes:
by the modulation circuit, controlling a difference between a voltage of the valley reference signal and a voltage of the first voltage signal.

11. The method of claim 10, further comprising:
by the modulation circuit, adjusting the non-zero voltage value.

12. The method of claim 9, further comprising:
by the modulation circuit, adjusting the non-zero voltage value.

13. The method of claim 9, wherein turning the switch off to control the peak inductor current includes turning the switch off when the first signal equals or exceeds the error signal.

14. The method of claim 9, further comprising:
providing an output signal to an output circuit to in a first state when the first signal is less than or equal to the valley reference signal, and providing the output signal in a second state when the first signal is greater than the valley reference signal.

* * * * *